United States Patent [19]

Schwark

[11] Patent Number: 5,032,649
[45] Date of Patent: Jul. 16, 1991

[54] ORGANIC AMIDE-MODIFIED POLYSILAZANE CERAMIC PRECURSORS

[75] Inventor: Joanne M. Schwark, Wilmington, Del.

[73] Assignee: Hercules Incorporated, Wilmington, Del.

[21] Appl. No.: 441,667

[22] Filed: Nov. 27, 1989

[51] Int. Cl.$^5$ ............................................. C08F 283/00
[52] U.S. Cl. ..................................... 525/474; 501/92; 528/26; 528/28
[58] Field of Search ................... 501/92; 528/28, 26; 525/474

[56] References Cited

U.S. PATENT DOCUMENTS 4,482,669 11/1984 Seyferth et al. ..................... 524/442
4,774,312 9/1988 Burns ..................................... 528/33
4,929,704 5/1990 Schwark ............................... 525/474

Primary Examiner—Melvyn I. Marquis
Attorney, Agent, or Firm—Joanne W. Patterson

[57] ABSTRACT

Silazane polymers are prepared by (1) reacting ammonia with one or more halogenated organic silicon compounds containing an Si-H bond to produce a silazane ammonolysis product, (2) mixing the ammonolysis product with 0.1% to 30% by weight of an organic amide or thioamide, and (3) heating to a temperature of 30° to 300° C. Silazane polymers containing alkenyl or alkynyl groups can be cured by supplying energy to generate free radicals. The cured or uncured polymers can be pyrolyzed to produce silicon nitride-containing ceramic materials.

15 Claims, No Drawings

ORGANIC AMIDE-MODIFIED POLYSILAZANE CERAMIC PRECURSORS

FIELD OF THE INVENTION

This invention relates to silazane polymers. This invention especially relates to a method for preparing organic amide-modified polysilazanes, and silicon nitride-containing ceramic materials produced by pyrolysis of the polymers.

BACKGROUND OF THE INVENTION

Silicon nitride has generated considerable interest as a ceramic material because of its high thermal and oxidative stability and extreme hardness. Other advantageous properties include low electrical conductivity, low coefficient of thermal expansion, excellent thermal shock and creep resistance, high strength at elevated temperatures and excellent corrosion resistance.

One method for obtaining silicon nitride-containing ceramic materials is the pyrolysis of polyorganosilazanes. Seyferth et al. (U.S. Pat. No. 4,482,669) describe the cross-linking of the ammonolysis product of an organodihalosilane in the presence of a basic catalyst such as an alkali metal amide to form a polysilazane ceramic precursor. This material is especially useful as a binder for ceramic powders. Burns (U.S. Pat. No. 4,774,312) describes a process for preparing a crosslinkable polydisilacyclobutasilazane ceramic precursor by reacting chlorodisilacyclobutane with cyclic silazanes. A catalyst such as a metal hydride or metal amide, e.g., lithium diethylamide, can be used for the cross-linking reaction. The preparation of polysilazane ceramic precursors is also described, for example, in U.S. Pat. Nos. 4,689,252 (Lebrun and Porte); 4,612,383 (Laine and Blum); 4,675,424 (King et al.) and 4,722,988 (Porte and Lebrun).

In general, the above methods are deficient in that it is difficult or impossible to control the viscosities of the polysilazanes so that they are suitable for the intended end use of the polymer. For example, low viscosities are desirable for polymers used to produce thin films or to infiltrate porous ceramic bodies, and high viscosities are desirable for making fibers.

SUMMARY OF THE INVENTION

A method has now been found for preparing modified polysilazane ceramic precursors in which the viscosity of the polymer can be easily controlled. The polymers are prepared by a method comprising (1) preparing a silazane ammonolysis product by reacting ammonia with a halogenated silicon compound selected from the group consisting of $RSiX_3$, $RR'SiX_2$ and mixtures thereof, wherein X is selected from the group consisting of Cl, Br and I; and R and R' are the same or different and are selected from the group consisting of H, substituted or unsubstituted 1-6 carbon alkyl, aryl, 2-6 carbon alkenyl and 2-6 carbon alkynyl groups, wherein the reaction mixture contains at least one halogenated silicon compound having a Si-H bond, (2) mixing the silazane ammonolysis product with from about 0.1% to about 30% by weight, based on the weight of the ammonolysis product, of an organic amide or thioamide, and (3) heating to a temperature of from about 30° to about 300° C.

Polymers where at least one of R and R' is an alkenyl or alkynyl group can be cured by supplying energy to generate free radicals. The cured or uncured modified polysilazane can be used to prepare silicon nitride-containing ceramic materials by heating to a temperature of at least 800° C. in an inert or ammonia-containing atmosphere.

DETAILED DESCRIPTION OF THE INVENTION

The first step of the process for preparing the silazane polymers of this invention comprises reacting ammonia, or a mixture of ammonia and a substituted or unsubstituted 1-4 carbon alkyl or aryl amine, with a halogenated silicon compound selected from the group consisting of $RSiX_3$, $RR'SiX_2$ and mixtures thereof, including mixtures where more than one compound having the formula $RSiX_3$ or $RR'SiX_2$ is used. Optionally, $RR'R''SiX$, $SiX_4$ or mixtures thereof can also be present in the reaction mixture. X can be Cl, Br, or I. Cl is preferred. R, R' and R'' can be the same or different and are selected from the group consisting of H, substituted or unsubstituted 1-6 carbon alkyl, aryl, 2-6 carbon alkenyl and 2-6 carbon alkynyl groups. The reaction mixture must contain at least one halogenated silicon compound having a Si-H bond. Examples of halogenated silicon compounds suitable for use in the process of this invention include, but are not limited to, methyldichlorosilane, vinylmethyldichlorosilane, tetrachlorosilane, tetrabromosilane, trichlorosilane, vinyltrichlorosilane, methyltrichlorosilane, phenyltrichlorosilane, ethyltrichlorosilane, propyltrichlorosilane, butyltrichlorosilane, methyltribromosilane, dimethyldichlorosilane, phenylmethyldichlorosilane, dimethyldibromosilane, trimethylchlorosilane, dimethylchlorosilane, dimethylvinylchlorosilane, and trimethylbromosilane.

The ammonolysis product that is formed also contains Si-H bonds. When ammonia alone is reacted with the halogenated silicon compound, the ammonolysis product is predominantly a mixture of cyclic compounds of varying ring size, but can possibly contain small amounts (usually less than 1%) of linear species. When a mixture of ammonia and an alkyl or aryl amine is used, the ammonolysis product contains more linear than cyclic species.

The ammonolysis product is then mixed with from 0.1% to about 30%, based on the weight of the ammonolysis product, of an organic amide or thioamide. From 0.5% to about 5% by weight of the organic amide or thioamide is preferred. After the addition of the organic amide or thioamide, the mixture is heated to 30°-300° C., preferably from 110° to 180° C., to initiate partial cross-linking as indicated by a substantial increase in molecular weight and viscosity, e.g., an increase in viscosity from 15 to 20,000 cps at 25° C., and evolution of hydrogen gas. The reaction can be carried out with or without a solvent, although it is preferably carried out without a solvent. Although the exact reaction mechanism is not known, it is believed that the first step of the reaction is the cleavage of the bond between a nitrogen atom and a silicon atom bonded to hydrogen and insertion of the C=O or C=S of the amide or thioamide between the Si and N atoms, accompanied by evolution of hydrogen gas. There is no cross-linking, and therefore no evolution of hydrogen gas, if Si-H bonds are not present in the ammonolysis product.

The silazane polymer that is formed can be a liquid that is soluble in common organic solvents and is stable in the absence of moisture. Alternatively, solids can be formed by reaction with higher concentrations of amides at high temperatures. These solid polymers are not generally soluble in common organic solvents.

The organic amides and thioamides used in the process of this invention can be monofunctional or polyfunctional, substituted or unsubstituted 1-6 carbon alkyl, aryl, 2-6 carbon alkenyl or 2-6 carbon alkynyl compounds. Suitable organic amides and thioamides include, but are not limited to, acetamide, N-methylacetamide, N,N-dimethylacetamide, benzamide, thiobenzamide, formamide, N-methylformamide, dimethylformamide, urea, N-methylurea, 1,1-dimethylurea, 1,3-dimethylurea and 1-methyl-2-thiourea.

The viscosity of the final product can be controlled by varying the amount of the organic amide or thioamide that is reacted with the silazane ammonolysis product. Low levels of reactant produce low viscosity polymers, while higher levels produce extremely viscous polymers or solids. The viscosity is also affected by the heating temperature, i.e., higher temperatures yield higher viscosities. The viscosity can therefore be tailored to the end use of the polymer.

The silazane polymers of this invention that contain at least one alkenyl or alkynyl group can be further cross-linked, i.e., cured, through the alkenyl or alkynyl unsaturation by supplying energy to generate free radicals. For example, the polymer can be heated in the presence of a radical source such as a peroxide. When liquid polymers are heated in the presence of a peroxide, solid polysilazanes are produced. The polymers can also be cross-linked by exposing the polymer to UV light or electron beam radiation.

The cured or uncured polysilazanes of this invention can be pyrolyzed at a temperature of at least 800° C. under an inert or ammonia-containing atmosphere to yield a silicon nitride-containing ceramic material.

The silazane polymers can be used in the preparation of ceramic fibers and foams, in the infiltration of a preform structure and subsequent pyrolysis to produce a composite silicon nitride-containing structure, in the production of oxidation resistant coatings, as a thin film for electronic applications, as an adhesive or sealant, as a binder for ceramic or metal powders, and in injection molding.

In the following examples, all reactions are conducted under nitrogen. Solid amides are recrystallized from dry ethanol before use and then stored in a desiccator. Liquid amides are purified by methods discussed in "Purification of Laboratory Chemicals", 3rd Edition, by Perrin and Armarego. The amides are distilled and stored under nitrogen. For the reaction of the ammonolysis product with the organic amide, liquid amides are added by syringe. Solid amides are added to the sparged flask under a strong nitrogen flow.

EXAMPLE 1

A vinyl-substituted silazane ammonolysis product is prepared as follows. A 5 liter, three-necked flask is equipped with an overhead mechanical stirrer, a dry ice/acetone condenser, ($-78°$ C.), an ammonia/nitrogen inlet tube and a thermometer. The apparatus is sparged with nitrogen and then charged with hexane (1760 ml, dried over 4 A molecular sieves), methyldichlorosilane (209 ml, 230.9 g, 2.0 mol) and vinylmethyldichlorosilane (64 ml, 69.6 g, 0.5 mol). The ammonia is added at a rate of 3.5 l/min (9.37 mol) for one hour. During the addition, the temperature of the reaction rises from 25° C. to 69° C. After one hour, the ammonia flow is stopped and the reaction mixture cooled to room temperature. The reaction mixture is filtered on a glass-fritted funnel to remove the precipitated ammonium chloride. The hexane is removed from the filtrate under reduced pressure (28 mm Hg, 60° C.) to give $[(CH_3SiHNH)_{0.8}(CH_3SiCH=CH_2NH)_{0.2}]_x$ as a clear oil (150.76 g, 2.34 mol, 94% yield). The oil has a viscosity of 43 cps at 25° C. and a molecular weight of 560 g/mol.

A 100 ml, one-necked flask is equipped with a stir bar and a septum and sparged with nitrogen. The flask is then charged with the ammonolysis product and the weight percent of N-methylurea indicated in Table 1. The flask is placed in an oil bath on a stirrer/hot plate and the septum is replaced with a water condenser capped with a septum. A nitrogen inlet needle and oil bubbler outlet are placed in the septum. The reaction mixture is then heated to the temperature indicated in Table 1 for 20 hours. Evolution of hydrogen gas is observed. After completion of the reaction, the product is transferred under nitrogen to an appropriate storage vessel. The viscosity is measured using a Brookfield cone-and-plate viscometer. The term "gel" is used in the following tables when a solid polymer is formed.

TABLE 1

| Temp. (°C.) | Wt. % (Mol %) | Viscosity (cps) |
|---|---|---|
| 130 | 0.5 (0.4) | 1085 |
| 130 | 1.0 (0.5) | gel |
| 130 | 2.0 (1.8) | gel |
| 130 | 3.1 (2.8) | gel |
| 90 | 1.0 (0.9) | 904 |
| 120 | 1.0 (0.9) | 7817 |

EXAMPLE 2

A vinyl-substituted silazane ammonolysis product is prepared as described in Example 1 and is then reacted with acetamide using the procedure described in Example 1. Acetamide sublimes out of the reaction mixture above its melting point (79°-81° C.). Once the reaction mixture reaches 130° C., the flask becomes warm enough so that the sublimed acetamide melts and is returned to the pot. Until this happens, the reaction is not homogeneous. The reaction temperature, the amount of acetamide used and the viscosity of the product are indicated in Table 2.

TABLE 2

| Temp. (°C.) | Wt. % (Mol %) | Viscosity (cps) |
|---|---|---|
| 130 | 0.5 (0.6) | 425 |
| 130 | 1.0 (1.1) | 896 |
| 130 | 2.0 (2.2) | 14,658 |
| 130 | 4.0 (4.5) | 224,685 |
| 150 | 1.8 (2.0) | gel |
| 140 | 2.8 (3.1) | gel |

EXAMPLE 3

A vinyl-substituted silazane ammonolysis product is prepared as described in Example 1 and is then reacted with formamide using the procedure described in Example 1. The reaction temperature, the amount of formamide used and the viscosity of the product are indicated in Table 3.

TABLE 3

| Temp. (°C.) | Wt. % (Mol %) | Viscosity (cps) |
|---|---|---|
| 130 | 0.6 (0.9) | 2973 |
| 130 | 0.9 (1.3) | gel |
| 130 | 1.2 (1.7) | gel |

TABLE 3-continued

| Temp. (°C.) | Wt. % (Mol %) | Viscosity (cps) |
|---|---|---|
| 110 | 0.3 (0.4) | 1085 |
| 110 | 0.6 (0.9) | 3421 |
| 90 | 1.2 (1.7) | gel |

EXAMPLE 4

Dimethylformamide is reacted with the vinyl-substituted silazane ammonolysis product prepared as described in Example 1 using the procedure described in Example 1. The reaction temperature, the amount of dimethylformamide used and the viscosity of the product are indicated in Table 4.

TABLE 4

| Temp. (°C.) | Wt. % (Mol %) | Viscosity (cps) |
|---|---|---|
| 130 | 2.0 (1.8) | 1180 |
| 130 | 4.0 (3.7) | 3610 |
| 130 | 5.0 (4.6) | gel |
| 130 | 20.0 (22.0) | solid |

EXAMPLE 5

Thiobenzamide is reacted with the vinyl-substituted silazane ammonolysis product prepared as described in Example 1 using the procedure described in Example 1. The reaction temperature, the amount of thiobenzamide used and the viscosity of the product are shown in Table 5.

TABLE 5

| Temp. (°C.) | Wt. % (Mol %) | Viscosity (cps) |
|---|---|---|
| 130 | 4.7 (2.3) | 1455 |
| 130 | 9.2 (4.7) | 19,268 |

EXAMPLE 6

N-Methylthiourea is reacted with the vinyl-substituted silazane ammonolysis product prepared as described in Example 1 using the procedure described in Example 1. The reaction temperature, the amount of N-methylthiourea used and the viscosity of the product are shown in Table 6.

TABLE 6

| Temp. (°C.) | Wt. % (Mol %) | Viscosity (cps) |
|---|---|---|
| 90 | 1.0 (0.7) | 407 |
| 120 | 1.0 (0.7) | 2437 |
| 120 | 0.5 (0.4) | 1271 |

EXAMPLE 7

A one ounce glass jar is equipped with a stir bar and a septum and sparged with nitrogen. The jar is charged with the acetamide-modified polysilazane prepared as described in Example 2, using 2.0 wt. % acetamide and a reaction temperature of 130° C. Dicumyl peroxide (0.5 wt. %) is added. A nitrogen atmosphere is maintained in the jar using a nitrogen inlet needle and the reaction mixture is heated in an oil bath. When the temperature reaches 130°-140° C., the reaction mixture changes from a clear oil to an opaque solid. A thermogravimetric analysis (TGA) is performed (10° C./min, nitrogen atmosphere, 25°-950° C.). The solid amide-modified polysilazane has a TGA yield of 77 wt. % of a black ceramic material.

EXAMPLE 8

An acetamide-modified polysilazane is prepared as described in Example 2 using 1 wt. % acetamide and a reaction temperature of 130° C. The liquid polysilazane is thermoset to a solid and a thermogravimetric analysis is performed as described in Example 6. The solid polysilazane has a TGA yield of 79 wt. % of a black ceramic material.

EXAMPLE 9

A formamide-modified polysilazane is prepared as described in Example 3 using 0.6 wt. % formamide and a reaction temperature of 120° C. This liquid polysilazane has a TGA yield (20° C./min, nitrogen atmosphere, 25°-950° C.) of 61 wt. %.

The formamide-modified polysilazane is then thermoset to a solid as described in Example 6. The solid polysilazane has a TGA yield of 73 wt. % of a black ceramic material.

What I claim and desire to protect by Letters Patent is:

1. A process for preparing a silazane polymer comprising
   (1) preparing a silazane ammonolysis product by reacting ammonia with a halogenated silicon compound selected from the group consisting of $RSiX_3$, $RR'SiX_2$ and mixtures thereof, wherein X is selected from the group consisting of Cl, Br and I; and R and R' are the same or different and are selected from the group consisting of H, substituted or unsubstituted 1-6 carbon alkyl, aryl, 2-6 carbon alkenyl and 2-6 carbon alkynyl groups, wherein the reaction mixture contains at least one halogenated silicon compound having a Si—H bond,
   (2) mixing the silazane ammonolysis product with from about 0.1% to about 30% by weight, based on the weight of the ammonolysis product, of an organic amide or thioamide, and
   (3) heating to a temperature of from about 30° to about 300° C.

2. The process of claim 1 wherein the halogenated silicon compound additionally comprises $RR'R''SiX$, $SiX_4$ or mixtures thereof, wherein $R''$ has the same meaning as R and R'.

3. The process of claim 1 wherein the halogenated silicon compound is reacted with a mixture of ammonia and a substituted or unsubstituted 1-4 carbon alkyl or aryl amine in step (1).

4. The polymer prepared by the process of claim 1.

5. The polymer prepared by the process of claim 2.

6. The polymer prepared by the process of claim 3.

7. The product prepared by supplying energy to generate free radicals to cross-link the polymer of claim 4, wherein at least one of the groups R and R' is a 2-6 carbon alkenyl or alkynyl group.

8. The product prepared by supplying energy to generate free radicals to cross-link the polymer of claim 5, wherein at least one of the groups R and R' is a 2-6 carbon alkenyl or alkynyl group.

9. The product prepared by supplying energy to generate free radicals to cross-link the polymer of claim 6, wherein at least one of the groups R and R' is a 2-6 carbon alkenyl or alkynyl group.

10. A process for preparing a silicon nitride-containing ceramic material comprising heating the polymer of claim 4 to a temperature of at least 800° C. in an inert or ammonia-containing atmosphere.

11. A process for preparing a silicon nitride-containing ceramic material comprising heating the polymer of claim 5 to a temperature of at least 800° C. in an inert or ammonia-containing atmosphere.

12. A process for preparing a silicon nitride-containing ceramic material comprising heating the polymer of claim 6 to a temperature of at least 800° C. in an inert or ammonia-containing atmosphere.

13. A process for preparing a silicon nitride-containing ceramic material comprising heating the product of claim 7 to a temperature of at least 800° C. in an inert or ammonia-containing atmosphere.

14. A process for preparing a silicon nitride-containing ceramic material comprising heating the product of claim 8 to a temperature of at least 800° C. in an inert or ammonia-containing atmosphere.

15. A process for preparing a silicon nitride-containing material comprising heating the product of claim 9 to a temperature of at least 800° C. in an inert or ammonia-containing atmosphere.

* * * * *